(12) United States Patent
Fukuda

(10) Patent No.: US 9,278,658 B2
(45) Date of Patent: Mar. 8, 2016

(54) WATER STOP SHEET FOR WIRING HARNESS AND WATER STOP STRUCTURE OF WIRING HARNESS

(71) Applicant: Sumitomo Wiring Systems, Ltd., Yokkaichi (JP)

(72) Inventor: Takao Fukuda, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 95 days.

(21) Appl. No.: 14/276,040

(22) Filed: May 13, 2014

(65) Prior Publication Data

US 2014/0353926 A1     Dec. 4, 2014

(30) Foreign Application Priority Data

May 30, 2013    (JP) ................................. 2013-114705

(51) Int. Cl.
*H02G 3/22*      (2006.01)
*B60R 16/02*     (2006.01)

(52) U.S. Cl.
CPC ..... *B60R 16/0222* (2013.01); *Y10T 428/24777* (2015.01)

(58) Field of Classification Search
USPC ....................................................... 174/72 A
See application file for complete search history.

(56) References Cited

U.S. PATENT DOCUMENTS

| | | | |
|---|---|---|---|
| 6,211,464 B1* | 4/2001 | Mochizuki | B60R 16/0222 16/2.1 |
| 6,218,625 B1* | 4/2001 | Pulaski | B60R 16/0222 174/153 G |
| 6,267,385 B1* | 7/2001 | Okamoto | B60R 16/02 16/2.1 |
| 6,995,317 B1* | 2/2006 | Dzurilla | B60R 16/0222 16/2.1 |
| 8,975,524 B2* | 3/2015 | Kanai (Popovici) | B60R 16/0222 16/2.1 |
| 2002/0185297 A1 | 12/2002 | Otsuki et al. | |

FOREIGN PATENT DOCUMENTS

| | | |
|---|---|---|
| JP | 3417324 | 4/2003 |
| JP | 3692969 | 7/2005 |
| JP | 2011-121459 | 6/2011 |

* cited by examiner

*Primary Examiner* — Dhirubhai R Patel
(74) *Attorney, Agent, or Firm* — Gerald E. Hespos; Michael J. Porco; Matthew T. Hespos

(57) ABSTRACT

A water stop sheet to be wound around a wiring harness wired in a vehicle includes a closed-cell elastic sheet, an entire adhesive layer provided on one surface of the elastic sheet, and a partial adhesive layer provided only on a part of the other surface along one end edge. The water stop sheet is wound with the entire adhesive layer located on an inner surface side to be held in contact with the outer periphery of a wire group of the wiring harness and wound at least one turn. A winding end part is placed on the outer peripheral surface of a winding start part. The partial adhesive layer located on the outer peripheral surface of the winding start part and the entire adhesive layer located on the inner peripheral surface of the winding end part are adhered to each other.

3 Claims, 4 Drawing Sheets

WATER STOP SHEET FOR WIRING HARNESS AND WATER STOP STRUCTURE OF WIRING HARNESS

BACKGROUND

1. Field of the Invention

The invention relates to a water stop sheet for a wiring harness and a water stop structure of a wiring harness to prevent water from entering a vehicle interior along a wiring harness that passes through a hole of a panel between a water susceptible area, such as an engine room, and the vehicle interior of a vehicle.

2. Description of the Related Art

The Publication of Japanese Patent No. 3417324 discloses a water stop structure for a wiring harness that passes through a grommet and is mounted in a through hole of a vehicle body panel. A water stop agent, such as silicone resin, is filled between parts of the wires of the wiring harness inserted through the grommet for stopping inter-wire water.

The above-described water stop structure prevents water from entering from into a vehicle interior, but requires many difficult manual operations and dedicated tools, which leads to a cost increase. Further, a visual inspection cannot be carried out since water is stopped in the grommet, and a water-stop inspection requires immersion in water, such as in a water tank. This inspection increases costs. Further, a silicone resin filling of an inter-wire water stop portion becomes hard after curing and can peel when bent, thereby destroying the inter-wire water stopping.

The subject inventor discloses a water stop method in the Publication of Japanese Patent No. 3692969 that differs from the above-described water stop technique. This alternate water stop method winds a waterproofing closed cell foamed sheet 120 around a wiring harness 100 and fits this assembly through a grommet 110 that is to be mounted into a through hole of a vehicle body panel. The waterproofing foamed sheet 120 closely contacts the inner peripheral surface of a small-diameter tube portion 110a of the grommet 110 to prevent the entrance of water from a water susceptible area of an engine room into a vehicle interior, as shown in FIGS. 5 and 6(A) to 6(C).

Specifically, the closed cell foamed sheet 120 has adhesive layers 121, 122 on both sides. As shown in FIG. 6(A), wires 100w of the wiring harness are arranged at intervals in a half area of the adhesive layer on the top side of the foamed sheet 120, and the remaining half is folded to sandwich the wires 100w between upper and lower parts of the adhesive layer 121 on the top side, as shown in FIG. 6(B). The foamed sheet 120 folded in two then is wound to adhere parts of the adhesive layer 122 on the under side as shown in FIG. 6(C). The small-diameter tube portion 110a of the grommet 110 shown in FIG. 5 is expanded by a tool, and a part of the wiring harness 100 wound with the foamed sheet 120 is inserted and resiliently compressed in the small-diameter tube portion 110 to be fixed in the grommet 110.

The adhesive layers on the inner and outer peripheral surfaces of the wound foamed sheet 120 are overlapped and fixed to block the entrance of water. Further, the closed cell foamed sheet 120 can block the entrance of water in a direction perpendicular to the axial direction from the outer peripheral surface into the interior during car washing and high-pressure washing.

Folding the foamed sheet 120 to sandwich the wires 100w and then winding the assembly at least one turn enlarges the diameter of the water stop part. This large diameter water stop part must be pushed into the small-diameter tube portion 110a of the grommet 110 by expanding the small-diameter tube portion 110a using the tool, and an operation of inserting the wiring harness 100 with the water stop part into the grommet 110 requires much trouble. In addition, the small-diameter tube portion 110a of the grommet 110 is not easily curved due to the enlarged in diameter of the water stop part. Thus, the wiring harness is not bent easily by 90° to lie along the vehicle body panel immediately after inserting the wiring harness through the through hole of the vehicle body panel.

Further, the adhesive layers extend across all of both surfaces of the foamed sheet. The foamed sheet may be creased during the folding, adhering and winding, and the foamed sheet is adhered in a creased state. Once adhered, the adhesive layers are not easily peeled. Thus, adhering and winding the foamed sheet in a crease-free state is difficult. A clearance formed in a creased part of the sheet serves as a water entrance path and the reliability of water stop performance is reduced.

An adhesive layer that is provided only on the top side of a foamed sheet could be peeled easily during an operation of folding, adhering and winding. Thus, the operations easily can be redone if the foamed sheet is creased. However, this approach reduces an adhesive force at a winding end and the foamed sheet tends to be peeled from the winding end.

In view of the above problems, an object of the invention is to provide a water stop sheet that is unlikely to be creased when being wound around a wire group of a wiring harness, and enables an operation to be redone easily even if the water stop sheet is creased and is unlikely to be peeled from a winding end. Another object of the invention is to provide a water stop structure of a wiring harness that uses the water stop sheet, requires no dedicated tool, has good operability and can be formed without increasing cost.

SUMMARY OF THE INVENTION

The invention is directed to a water stop sheet for wiring harness to be wound around a wiring harness of a vehicle. The water stop sheet preferably is a closed-cell elastic sheet. An adhesive layer is provided entirely on a first surface of the elastic sheet; and a partial adhesive layer provided on the second surface along one end edge. The water stop sheet is wound with the entire adhesive layer located on an inner surface side and held in contact with the outer periphery of a wire group of the wiring harness. The sheet then is wound at least one turn, and a winding end part is placed on the outer peripheral surface of a winding start part. The partial adhesive layer located on the outer peripheral surface of the winding start part and the entire adhesive layer located on the inner peripheral surface of the winding end part are adhered to each other.

The water stop sheet of Japanese Patent No. 3417324 has adhesive layers entirely on both sides, and it is very difficult to peel the water stop sheet once wound. Thus, the water stop sheet is difficult to rewind if the sheet is creased. However, the adhesive is provided entirely on only one surface of the water stop sheet of the invention and is provided on only the part of the other surface that is overlapped during winding. Thus, the water stop sheet easily can be wound again and creases can be prevented. In addition, the adhesive layers are present on both overlapping surfaces on a winding start side of an inner peripheral side and a winding end side of an outer peripheral side in the winding end part. Thus, an adhesive force is increased to prevent peeling from the winding end and to enhance the reliability of water stop performance.

The water stop sheet of the invention is formed of a closed-cell elastic sheet and can be wound in close contact with the outer surface of the wire group of the wiring harness without forming any clearance between the water stop sheet and the outer peripheral surface of the wire group. A clearance between the outer peripheral surface of the wire group and the inner peripheral surface of the water stop sheet serves as a water entrance path by a capillary phenomenon and water easily enters the wiring harness along the wires. However, the water stop sheet of the invention can be wound around the outer peripheral surface of the wire group without forming any clearance. Thus, water cannot enter by capillary action.

Further, the elastic sheet used in the water stop sheet is a closed-cell foam. Thus, water cannot enter from outside during car washing and high-pressing car washing.

The elastic sheet used in the water stop sheet of the invention preferably is formed of a material in which a foaming agent is mixed in flexible resin, such as EPDM or EPT.

A thickness of the water stop sheet of the invention is 0.1 to 5 mm, preferably 1 to 2 mm.

The water stop sheet has such a long and narrow rectangular shape with a width that is the sum of an outer peripheral dimension of the wiring harness to be wound and a dimension of an overlapping portion and a length equals a length of a water stop part of the wiring harness.

Release papers preferably are adhered to outer surfaces of both the entire adhesive layer and the partial adhesive layer and are peeled when used.

The invention also is directed to a water stop structure of a wiring harness where the above-described water stop sheet is wound around the outer periphery of a wire group of a wiring harness, and an adhesive tape is wound spirally and roughly on the outer peripheral surface of the wound water stop sheet in a spaced-apart manner in a longitudinal direction.

The overlapped inner peripheral surface of the winding end part and the outer peripheral surface of the winding start part of the water stop sheet are fixed by the adhesive layers when the water stop sheet is wound around the outer peripheral surface of the wiring harness. Thus, the water stop sheet is unlikely to be peeled from the winding end. However, the wiring harness may be bent quickly along a wiring path. Thus, a large load is applied in a bending direction to the fixed part of the adhesive layers extending in an axial direction of the wiring harness and acts in a direction to peel the winding end. Therefore the water stop sheet may be peeled in a so-called mouth-open state at the bend. However, the adhesive tape is wound spirally and roughly on the outer periphery of the part wound with the water stop sheet in a space-apart manner to prevent peeling of the water stop sheet from the winding end even at a suddenly bent part.

The water stop performance is ensured by winding the water stop sheet. Hence the tape need not be wound tightly to stop the entrance of water. If the adhesive tape is wound tightly in a half overlapping manner, the wiring harness loses flexibility and is difficult to bend along the wiring path. Accordingly, the adhesive tape is wound roughly, as described above.

An adhesive tape in which an adhesive is applied to one surface of a widely used vinyl chloride tape or the like is used as the adhesive tape.

The entrance of water in a water susceptible area can be prevented effectively by spirally and roughly winding the tape around the outer peripheral surface of the water stop sheet that is wound around the outer peripheral surface of the wiring harness in an area where the wiring harness passes through the water susceptible area.

The invention also relates to a water stop structure with the above-described water stop sheet wound around the outer periphery of a wire group of a wiring harness and with the wiring harness inserted through a small-diameter tube portion of a grommet that is to be mounted into a through hole of a vehicle body panel is externally fitted on a wiring harness.

A tape preferably is wound spirally and roughly around the outer peripheral surface of the water stop sheet extending out from the small-diameter tube portion of the grommet.

The grommet preferably is mounted into a through hole of vehicle body panel between an engine room and a vehicle interior and causes the wiring harness to extend obliquely down from the grommet toward the engine room, which is a water susceptible area. Water is prevented from entering into the wire group of the wiring harness at a position inserted through the grommet without filling a water stop agent by setting a product of a length (L) between a minimum height position of the wiring harness and the grommet and a height difference (H) therebetween to be not smaller than a set value.

If the product (L)×(H) is smaller than the set value, it is possible to lower a water entrance surface by providing a drainage hole in a protector to be externally mounted on the wiring harness. If (H2) denotes a height difference between the lower surface of the drainage hole of the protector and the grommet, the entrance of water can be stopped without filling the water stop agent if a product (L)×(H2) satisfies the set value.

Thus, even if a configuration capable of draining water from the lowest position in the wiring path of the wiring harness is adopted, it is preferable to fill the water stop agent into the wire group of the wiring harness in the part inserted through the grommet, thereby stopping the entrance of water between the wires and enhancing water stop performance if the product (L)×(H) or (L)×(H2) is smaller than the set value.

The small-diameter tube portion of the grommet maintains the wound state of the water stop sheet and the wound tape is not required at the part of the wiring harness in the small-diameter tube portion of the grommet.

The grommet prevents water from entering the through hole perforated in the vehicle body panel or dash panel between the engine room and the vehicle interior of an automotive vehicle to insert the wiring harness, and the grommet also prevents the entrance of water through a clearance between the inner peripheral surface of the through hole and the outer peripheral surface of the wiring harness.

A case where water having entered between the wires of the wiring harness in the engine room enters the vehicle interior along clearances between the wires of the wiring harness by a capillary phenomenon is further known as one factor of the entrance of water into the vehicle interior. Other factors include a case where water is directly sprayed on the wiring harness from outside during car washing, particularly high-pressure washing and a case where water enters into the wiring harness through a sheet material externally mounted on the wiring harness. If water is directly sprayed on the wiring harness from outside such as during car washing, the entrance of water into the interior from the outside can be prevented since the water stop sheet of the present invention is formed of a closed-cell foamed material. In addition, since the winding end of the water stop sheet is firmly wound and fixed so as not to be peeled, the entrance of water along the longitudinal direction of the water stop sheet can also be prevented.

Water droplets may be deposited on the wire outer peripheral surfaces of the wiring harness, such as at a connector connecting side of the tip of the wiring harness located in the engine room. This water has the potential to enter clearances between the wires and to flow into the grommet by the capillary phenomenon. Repeated experiments by the present inventor have shown that the entrance of water into the grommet by the capillary phenomenon occurred depending on the product of the length (L) from the position of water entrance to the grommet and the height difference (H) or (H2). Specifically, inter-wire water stopping of the wiring harness in the grommet is performed if the product (L)×(H) or (L)×(H2) is smaller than the set value, whereas a water stop function can be maintained even if inter-wire water stopping is not performed if the product is not smaller than the set value.

The entire adhesive layer is provided on the one surface of the closed-cell elastic sheet and the partial adhesive layer is provided only on the part of the other surface along the one end edge in the water stop sheet of the invention. Thus, the operation of winding the water stop sheet around the outer periphery of the wire group of the wiring harness and the operation of performing the winding again can be performed easily and the water stop sheet can be wound without forming creases that could serve as water entrance paths. In addition, the adhesive layer on the inner peripheral surface of the winding end part is placed on the adhesive layer on the outer peripheral surface of the winding start side to fix the adhesive layers to each other. Thus, peeling from the winding end is prevented and the reliability of water stop performance of the water stop sheet is enhanced.

The elastic sheet of Japanese Patent No. 3417324 is folded into two and wound while sandwiching the wires. As a result, the outer diameter is large. However, the water stop sheet of the invention is wound one turn around the outer periphery of the wiring harness and the opposite ends are overlapped and bonded without being folded into two. Thus, the outer diameter is reduced as compared with Japanese Patent No. 3417324. As a result, the wiring harness wound with the water stop sheet can be inserted through the small-diameter tube portion of the grommet without enlarging the small-diameter tube portion of the grommet, and the small-diameter tube portion can maintain sufficient flexibility to be bent easily bent without becoming hard.

BRIEF DESCRIPTION OF THE DRAWINGS

FIG. 1(A) is a section showing a state where a wiring harness wound with a water stop sheet is inserted through a grommet mounted in a through hole of a vehicle body panel, FIG. 1(B) is a section along B-B of FIG. 1(A), FIG. 1(C) is a front view of FIG. 1(A) and FIG. 1(D) is an enlarged perspective view of a part of the wiring harness on which a protector is externally mounted.

FIGS. 2(A)-2(C) show the water stop sheet, wherein FIG. 2(A) is a perspective view, FIG. 2(B) is a section along B-B of FIG. 2(A) and FIG. 2(C) is a side view of the water stop sheet.

DETAILED DESCRIPTION OF THE PREFERRED EMBODIMENTS

Figure 1A:
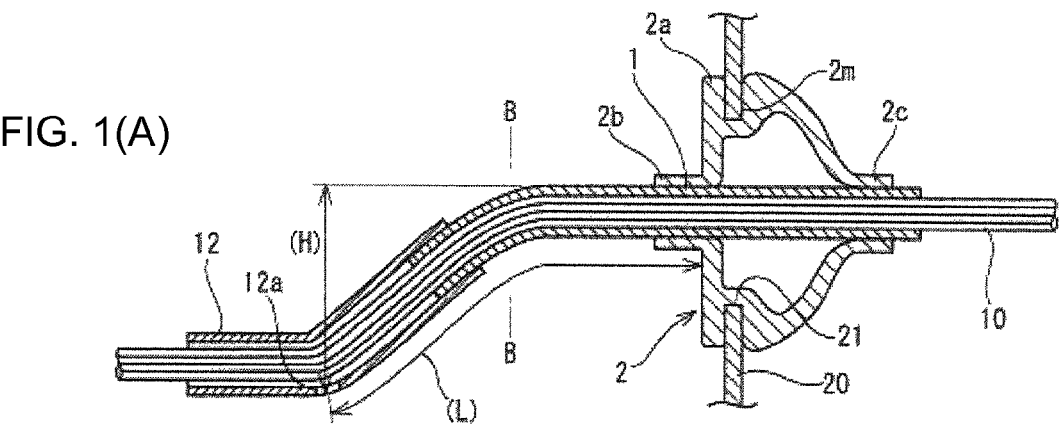
FIGS. 1(A)-1(D) show an embodiment of the invention, where

As shown in FIGS. 1, a water stop sheet 1 of the present invention is wound around a wiring harness 10, a part of the wiring harness 10 wound with the water stop sheet 1 is inserted through the grommet 2, and the grommet 2 is mounted into a through hole 21 in a vehicle body panel 20, such as a dash panel of an automotive vehicle.

As shown in FIG. 1(A), the vehicle body panel 20 is a partition between an engine room and a vehicle interior, and the wiring harness 10 wired in the engine room is inserted through the through hole 21 to be wired in the vehicle interior. A protector 12 provided with a drainage hole 12a at a minimum height position of a wiring path is mounted externally on the wiring harness 10 wired from a mounted position of the grommet 2 toward the engine room, which is a water susceptible area.

The water stop sheet 1 is wound around a wire group 10w of the wiring harness 10 in a part inserted through the grommet 2 and up to a position reaching the protector 12. Further, an adhesive tape 11 is wound spirally and roughly on the outer peripheral surface of the water stop sheet 1 in an area from a position exiting from the grommet 2 to the protector 12.

Figure 1C:
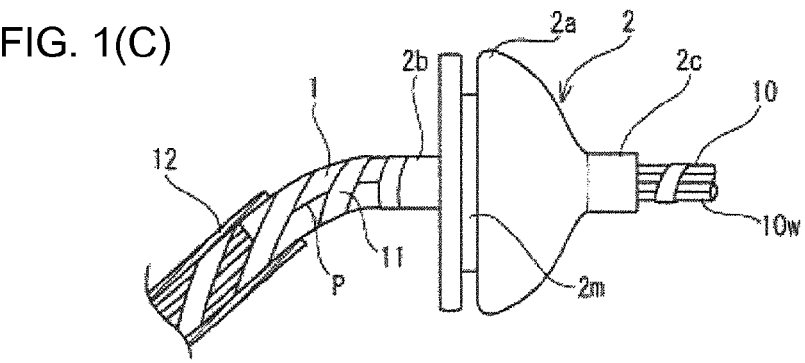
Figure 1D:
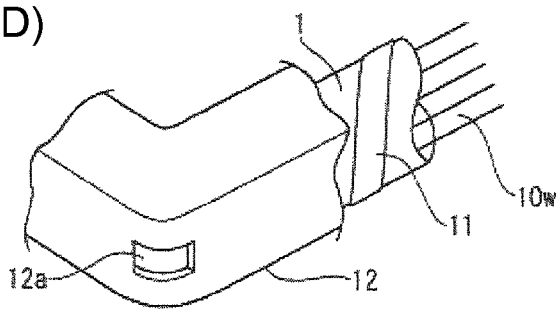
Figure 2A:
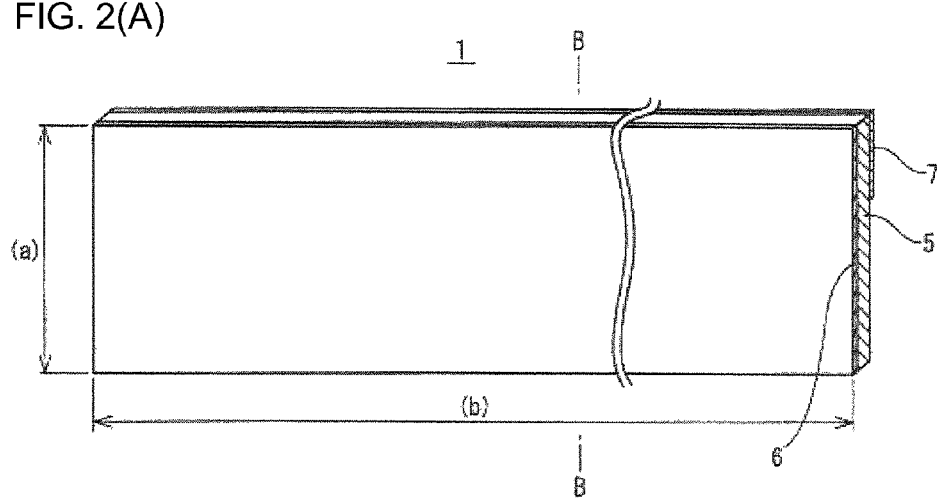
Figure 2B:
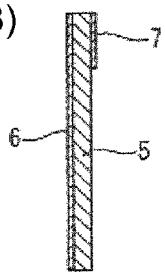
Figure 2C:
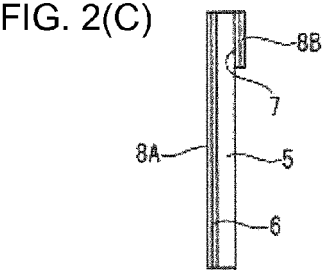

As shown in FIGS. 2, the water stop sheet 1 has an adhesive layer 6 provided entirely on one surface of a closed-cell elastic sheet 5 and a partial adhesive layer 7 is provided only on a part of the other surface along one widthwise end edge. As shown in FIG. 1(C), release papers 8A, 8B released when used are adhered to the outer surfaces of the entire adhesive layer 6 and the partial adhesive layer 7.

The water stop sheet 1 is a long and narrow rectangle with a width (a) and a length (b), as shown in FIG. 2(A). The width (a) is the sum of an outer peripheral dimension of the wiring harness 10 and a dimension of an overlapping portion (p). The length (b) is a length dimension corresponding to a length of a water stop area of the wiring harness.

The elastic sheet is formed of an elastic material such as EPDM, EPT or urethane. In this embodiment, an EPT sheet is used. A thickness of the water stop sheet 1 is 0.1 to 5 mm, preferably 1 to 2 mm.

Figure 1B:
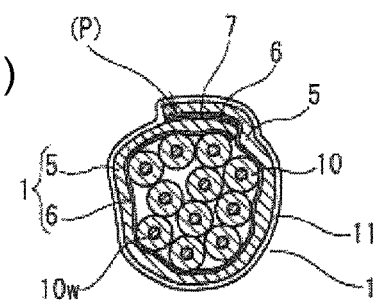
Figure 3A:
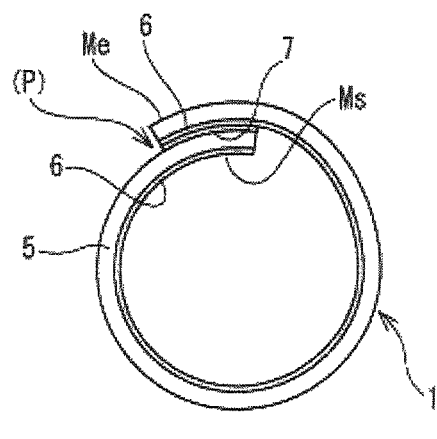
FIG. 3(A) is a front view showing a wound state of the water stop sheet and FIG. 3(B) is an enlarged view showing an overlapping portion in a wound state.
Figure 3B:
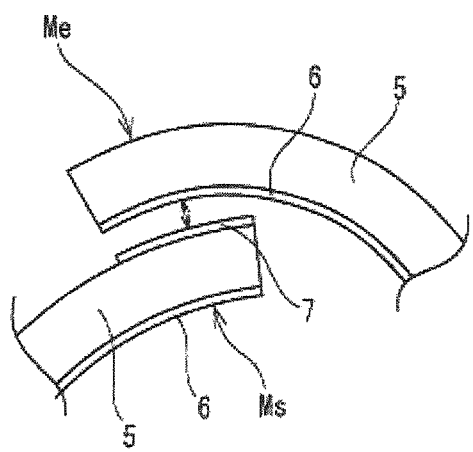

As shown in FIGS. 1(B) and 3, the water stop sheet 1 is wound with the entire adhesive layer 6 on one side of the elastic sheet 5 located on an inner side to be held in contact with the outer peripheral surface of the wire group 10w of the wiring harness 10. The water stop sheet 1 is wound at least one turn and a winding end part Me is placed on the outer peripheral surface of a winding start part Ms, and the partial adhesive layer 7 located on the outer peripheral surface of the winding start part Ms and the entire adhesive layer 6 located on the inner peripheral surface of the winding end part Me are adhered to each other to be firmly fixed.

The adhesive tape 11 is wound spirally in a spaced-apart manner, i.e. roughly wound on the outer peripheral surface of the water stop sheet 1 wound on the wiring harness 10d. This adhesive tape 11 need not be wound around a part of the water stop sheet 1 to be inserted through the grommet 2.

The grommet 2 has a conical large-diameter tube portion 2a with an annular vehicle body locking groove 2m provided in an outer peripheral surface thereof. A closing wall projects in from the large diameter end of the conical tube portion 2a and a small-diameter tube portion 2b projects from the inner periphery of the closing wall. A middle-diameter tube portion 2c projects from the small-diameter end of the conical tube portion 2a. The wiring harness 10 around which the water stop sheet 1 is wound and fixed is inserted through a hollow part in which the medium-diameter tube portion 2c, the conical large-diameter tube portion 2a and the small-diameter tube portion 2b of the grommet 2 are connected one after another. At that time, since the small-diameter tube portion 2b has a smaller outer diameter than the wiring harness 10 wound with the water stop sheet 1, an expanding tool (not shown) is used to expand the small-diameter tube portion 2b and the wiring harness 10 is pushed into the small-diameter tube portion 2b. Thus, the outer peripheral surface of the water stop sheet 1 wound around the wiring harness 10 is held tightly in close contact with the inner peripheral surface of the small-diameter tube portion 2b and holds the water stop sheet 1 in a wound state. A water stop agent is not filled between the wires 10w of the wiring harness 10 in an area inserted through the grommet 2.

Further, the water stop sheet 1 wound around the wiring harness 10 is wound around a wired part on the engine room side from the small-diameter tube portion 2b of the grommet 2, but is not wound around a wired part on the vehicle interior side from the medium-diameter tube portion 2c. The adhesive tape 11 is wound in a spaced-apart manner (i.e. roughly wound) around the outer periphery of the water stop sheet 1 wound on the wired part from the grommet 2 to the engine room side.

The wiring harness on the engine room side from the mounted position of the grommet 2 is arranged obliquely downward, and the protector 12 with the drainage hole 12a on the bottom surface is mounted externally at the minimum height position of the wiring harness 10. The water stop sheet 1 is not wound around a part of the wiring harness 10 inserted through the protector 12, and the wires 10w are inserted in a loose manner so that water droplets deposited on the outer peripheral surfaces of the wires 10w fall due to their own weight through the drainage hole 12a.

Note that since a product (L)×(H) of a length (L) between the drainage hole 12a of the protector 12 and the mounted position of the grommet 2 and a height difference (H) between the drainage hole 12a and the grommet mount position is not smaller than a set value obtained in advance, the water stop agent is not filled between the wires of the wiring harness 10 in the grommet 2 as described above in this embodiment. The height difference (H) is, specifically, a height difference (H2) between the lower surface of the drainage hole of the protector and the grommet.

In the present invention having the above configuration, the entire adhesive layer 6 is provided on the one surface of the closed-cell elastic sheet 4 and the partial adhesive layer 7 is provided only on the part of the other surface along the one end edge in the water stop sheet 1. Thus, the water stop sheet 1 can be wound without forming creases, which tend to become water entrance paths, in the operation of winding the water stop sheet 1 around the outer periphery of the wire group of the wiring harness 10 and the operation of performing the winding again. In addition, in the part where the ends of the wound water stop sheet 1 are placed one over the other to be fixed, the adhesive layer on the inner peripheral surface of the winding end part is placed on the adhesive layer on the outer peripheral surface of the winding start side to fix the adhesive layers. This can prevent the peeling from the winding end and enhance the reliability of water stop performance of the water stop sheet.

Figure 4:
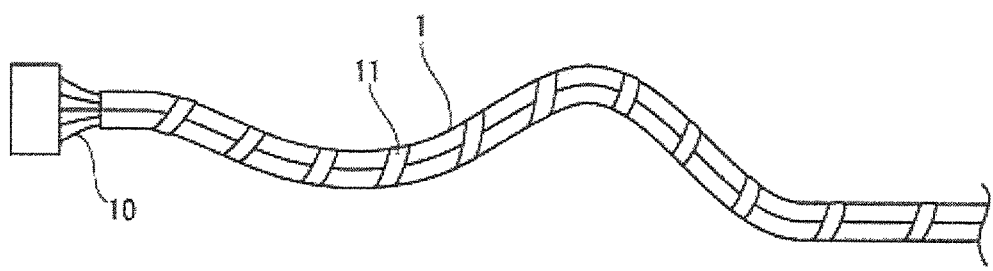
FIG. 4 is a schematic front view showing another embodiment.
Figure 5:
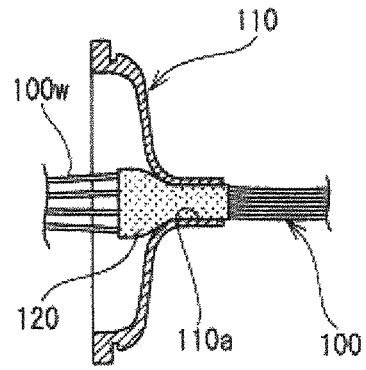
FIG. 5 is a section showing a prior art.
Figure 6A:
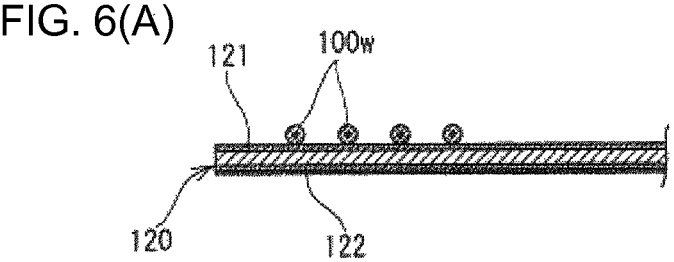
FIGS. 6(A) to 6(C) are sections showing operation steps of the prior art of FIG. 5.
Figure 6B:
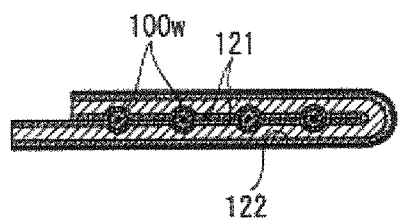
Figure 6C:
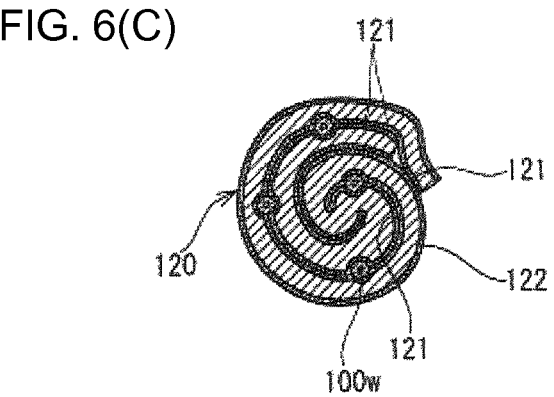

FIG. 4 shows another embodiment.

In this embodiment, the water stop sheet 1 is wound around a wiring harness 10 to be wired in a water susceptible area and an adhesive tape 11 is roughly wound. Although an area wound with the water stop sheet 1 is not inserted through a grommet, the entrance of water into the wiring harness can be prevented by applying the present invention to the wiring harness wired in an engine room or the like which is a water susceptible area. The configuration of the water stop sheet 1 and how to wind the water stop sheet 1 are not described since being the same as in the above embodiment.

What is claimed is:

1. A water stop sheet for a wiring harness of a vehicle, comprising:
    a closed-cell elastic sheet having opposite first and second surfaces;
    an entire adhesive layer provided on all of the first surface of the elastic sheet; and
    a partial adhesive layer provided only on a part of the second surface adjacent one end edge;
    wherein the water stop sheet is wound with the entire adhesive layer located on the first surface held in contact with the outer periphery of a wire group of the wiring harness and wound at least one turn, a winding end part is placed on the outer peripheral surface of a winding start part, and the partial adhesive layer located on the outer peripheral surface of the winding start part and the entire adhesive layer located on the inner peripheral surface of the winding end part are adhered to each other.

2. The water stop structure of claim 1, further comprising an adhesive tape spirally and roughly wound on the outer peripheral surface of the wound water stop sheet in a spaced-apart manner in a longitudinal direction.

3. The water stop structure of claim 1, further comprising a to be mounted into a through hole of a vehicle body panel, the wiring harness with the water stop sheet wound thereon being inserted through a small-diameter tube portion of the grommet.

* * * * *